(12) United States Patent
Aguilera et al.

(10) Patent No.: US 7,926,103 B2
(45) Date of Patent: Apr. 12, 2011

(54) SYSTEM AND METHOD FOR PREVENTING REPLAY ATTACKS

(75) Inventors: Marcos K. Aguilera, Palo Alt, CA (US); Mark D. Lillibridge, Mountain View, CA (US); John P. MacCormick, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2638 days.

(21) Appl. No.: 10/455,472

(22) Filed: Jun. 5, 2003

(65) Prior Publication Data

US 2005/0022009 A1    Jan. 27, 2005

(51) Int. Cl.
    *G06F 11/00*    (2006.01)
(52) U.S. Cl. ............................... 726/22; 726/23
(58) Field of Classification Search .................. 726/2–6, 726/11–13, 22, 23
    See application file for complete search history.

(56) References Cited

U.S. PATENT DOCUMENTS

| | | | | |
|---|---|---|---|---|
| 5,701,464 | A * | 12/1997 | Aucsmith | 707/10 |
| 5,850,523 | A * | 12/1998 | Gretta, Jr. | 709/224 |
| 2004/0054924 | A1* | 3/2004 | Chuah et al. | 713/201 |
| 2004/0103066 | A1* | 5/2004 | Staddon et al. | 705/80 |
| 2004/0181811 | A1* | 9/2004 | Rakib | 725/122 |

OTHER PUBLICATIONS

A. D. Birrell et al., "Implementing Remote Procedure Calls," ACM Transactions on Computer Systems, vol. 2, No. 1, Feb. 1984, pp. 39-59.
A. D. Birrell, "Secure Communication Using Remote Procedure Calls," ACM Transactions on Computer Systems, vol. 3, No. 1, Feb. 1985, pp. 1-14.
B. H. Bloom, "Space/Time Trade-offs In Hash Coding with Allowable Errors," Communications of the ACM, vol. 13, No. 7, Jul. 1970, pp. 422-426.
H. Gobioff, "Security for a High Performance Commodity Storage Subsystem," PhD thesis, CMU, Jul. 1999 (56 p., double-sided).
H. Gobioff, "Security for Network Attached Storage Devices," Technical Report CMU-CS-97-185, Carnegie Mellon, Oct. 1997, pp. 1-49).
B. Liskov et al., "Efficient At-Most-Once Messages Based on Synchroniz d Clocks," ACM Transactions on Computer Systems, 9(2):125-142, May 1991.

* cited by examiner

*Primary Examiner* — Jung Kim
*Assistant Examiner* — Devin Almeida

(57) ABSTRACT

Preventing replay attacks on servers. At least one Bloom filter may be set up in a server for tracking requests received from clients. Identifying data may be generated for each request. The identifying data may be checked against the Bloom filter array. If a match is found, the message may be a replay and may be rejected. If a match is not found, the request identifying data may be added to the Bloom filter and the request may be processed.

20 Claims, 5 Drawing Sheets

SYSTEM AND METHOD FOR PREVENTING REPLAY ATTACKS

BACKGROUND

For purposes of this disclosure, a computational entity capable of receiving and processing requests will be referred to as a server. A computational entity capable of sending requests to a server will be referred to as a client. For example, a client may be a personal computer which sends requests to a server at a stock trading company. The server may be a computer adapted to receive the requests and implement a buy or sell order. In similar fashion, a server may control a large storage system for business records, such as payroll records. A company payroll department may use a client computer to transmit periodic payroll records to the server with a request for writing the records into the storage system.

It is possible for a request previously sent by a genuine client entity to be sent again to the server. This is referred to as a replay attack, because it may cause serious problems. A replay attack may be sent by a malicious client who has snooped on an earlier genuine request from a genuine client. The malicious client may have copied the earlier request and then replayed it at a later time. For example, the request may have been an order to sell a particular stock at a particular price. A genuine client may have sent the original request and it may have been executed once. If a malicious client replays the request a few weeks later when the stock price has changed, or the client's account does not have the required amount of stock to sell, the genuine client can suffer serious financial loss if the sale is again executed.

In similar fashion, a payroll department may have sent a request which causes monthly payroll records to be written into a particular file location. That file may have been updated by the genuine client at a later date. Then, if the original request is resent by a malicious client, the original data may be written into the same file location and the updates may be lost.

A replay attack does not necessarily result from a malicious client who has snooped on genuine requests. It can occur due to human or machine error at the genuine client. In some cases, genuine clients with unreliable networks intentionally retransmit genuine requests. The same type of serious damage can be caused by such accidental, unintentional or even intentional replays of requests.

NOTATION AND NOMENCLATURE

Certain terms are used throughout the following description and claims to refer to particular system components. As one skilled in the art will appreciate, components may be referred to by different names. This document does not intend to distinguish between components that differ in name, but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical or communicative connection. Thus, if a first device couples to a second device, that connection may be through a direct connection, or through an indirect connection via other devices and connections.

DETAILED DESCRIPTION

The embodiments of the invention disclosed herein provide systems and methods for keeping a record identifying previously received requests, possibly only recently received requests, and comparing each new request to the record to determine if it is genuine or is a replay of a previously received request. The embodiments of the invention use a data structure known as a Bloom filter to record identifying information for each request as it is received so that a replay of that message may be recognized. A Bloom filter may be a highly efficient way of performing set-membership queries. Given a membership query, a Bloom filter answers either "probably an element" or "definitely not an element". In this case, the set may be previously received requests.

A Bloom filter may comprise an array of K bits, denoted $b_1, b_2, \ldots b_K$, together with $n \geq 1$ hash functions, $f_1, f_2, \ldots f_n$. The hash functions may be chosen from a family of independent hash functions. Each hash function may map requests to integers having values from 1 to K, that is, having a value corresponding to one of the K bits in the Bloom filter array. A Bloom filter may be initiated in an empty state in which each of its K bits is a zero. A request r may be added to the filter by setting the bits with indices $f_1(r), f_2(r), \ldots f_n(r)$ to a one. That is, $b[f_i(r)]$ is set to a 1 for all i. The answer to the question "is request r in the filter?", is "probably" if $b[f_i(r)]=1$ for all i, and "definitely not" otherwise.

Figure 1:
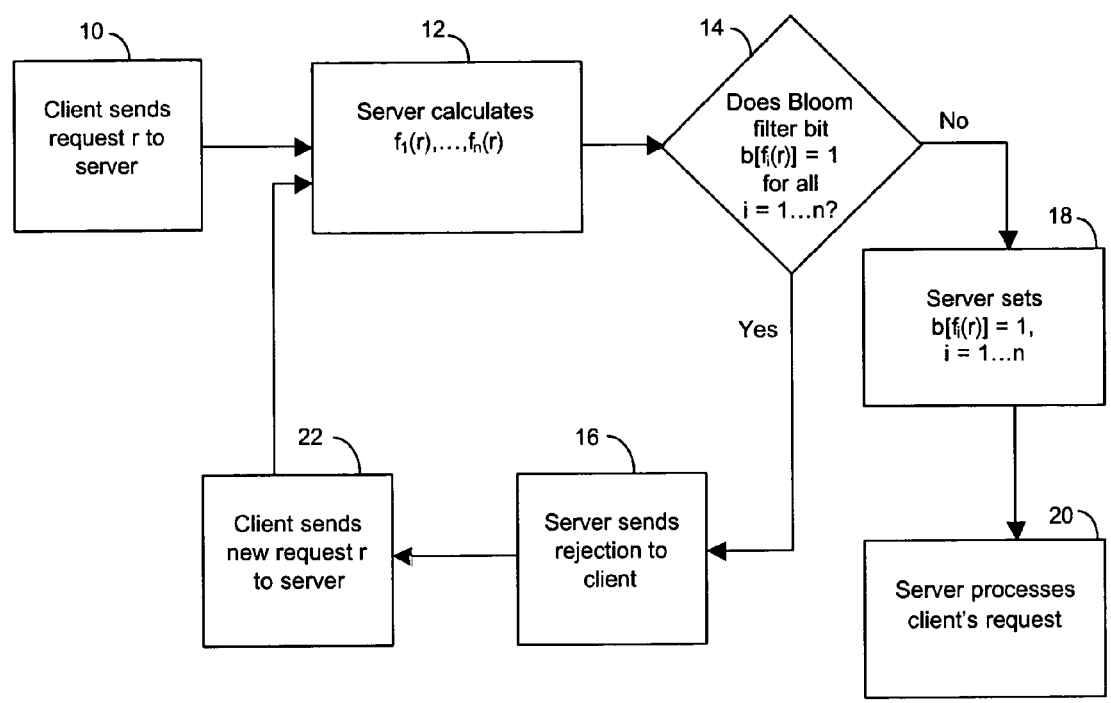
FIG. 1 illustrates a flow chart for preventing replay attacks in accordance with embodiments of the invention.

FIG. 1 illustrates a block diagram of the basic operation of at least some embodiments of the invention. At step 10, a client entity sends a request, r, to a server. At step 12, a server receives the request and calculates the values of each of the hash functions, i.e. $f_1(r), f_2(r), \ldots f_n(r)$. At step 14, the server compares the calculated hash function values against the array of bits stored in the Bloom filter which represent previously received requests. If the Bloom filter bits $b[f_i(r)]=1$ for all i from 1 to n, the request is probably a replay attack and, at step 16, the server sends a rejection of the request to the client. If less than all of the Bloom filter bits $b[f_i(r)]=1$, the request is genuine and the server accepts the request and, at step 18, sets the Bloom filter bits $b[f_i(r)]$ to 1 for all i from 1 to n, as a record of the fact that the current request has been received. Steps 14 and 18 may be executed together atomically. Performing step 18 for rejected requests does not change the state of the Bloom filter bit array, because all of the bits $b[f_i(r)]$ for all i from 1 to n were already set to 1. At step 20, the server processes the request which has been accepted and which is now identified in the Bloom filter. At step 20 the server may also send a message to the client indicating acceptance and processing of the request. If a rejection was sent at step 16, the client may at step 22 send a new message to the server. Methods are discussed below by which genuine clients may modify the request so that it may be accepted by the server, but which may prevent malicious clients from doing the same thing.

In the above described embodiments, each request which has been accepted by a server is identified by setting one of the bits in the Bloom filter array which correspond to the values of the hash functions calculated from the request. A genuine new request may be rejected because its hash function values match Bloom filter bits which have all been set to one by a combination of previous requests. This is considered a false positive. The possibility of a false positive increases as the number of requests which have been stored in the Bloom filter increases. If the process was continued indefinitely, all bits could be set to one and all new requests could be rejected. A simple solution would be to reset the Bloom filter to the empty state when a certain percentage of the bits have been set to one. However, this solution may result in loss of the identifying information on all previously received requests and may allow replays to be accepted and executed again. This result may be avoided by using a time stamp on requests and rejecting all requests with time stamps that indicate that the request was sent before the time at which the filter was reset to empty state. Use of time stamps for this purpose assumes that clocks in servers and clients are accurately synchronized, which may not be the case. Inaccuracies in clock settings may result in allowing a replay attack to occur. This result may be prevented by requiring the server to advance its clock to the value of any request whose timestamp is in the future relative to the server clock.

Figure 2:
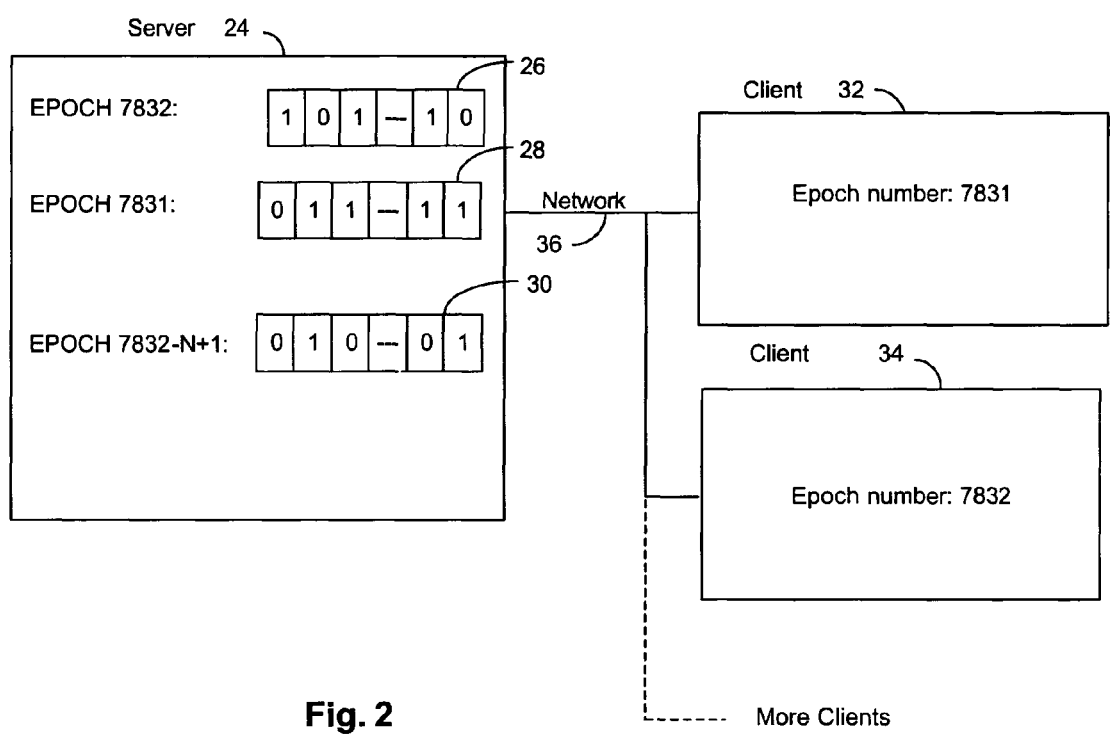
FIG. 2 illustrates a block diagram showing components of embodiments for preventing replay attacks.
Figure 3:
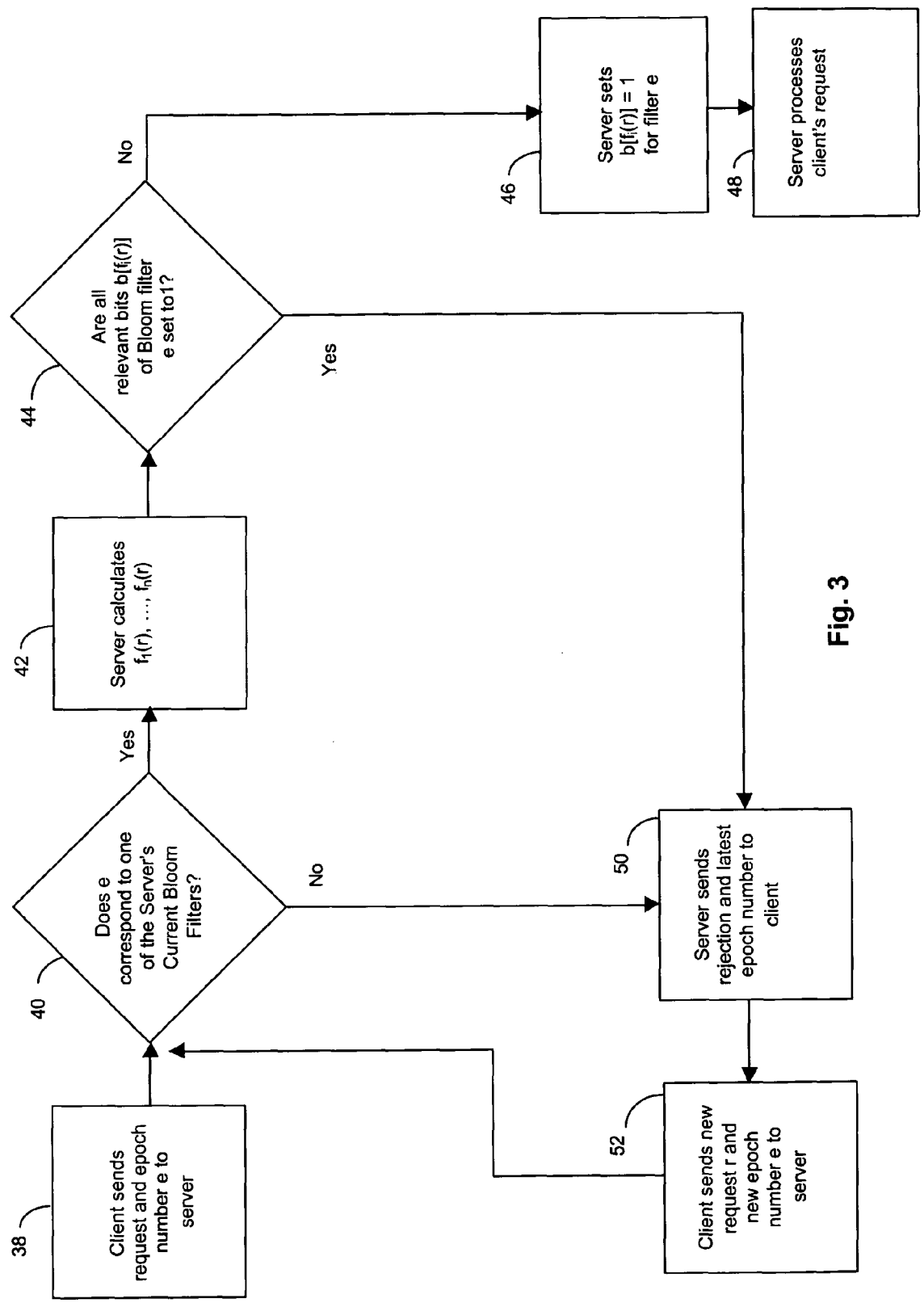
FIG. 3 illustrates a flow chart for preventing replay attacks using epochs in embodiments of the invention.

FIGS. 2 and 3 illustrate embodiments of the invention which limit false positives while still blocking replay attacks. These embodiments maintain several separate Bloom filters in the server, each identified by a separate epoch number. Each epoch corresponds to a recent time interval, beginning with the current time and going back one interval, or epoch, for each Bloom filter array.

FIG. 2 illustrates a server 24 having a number N of bit arrays 26, 28, 30, each being part of a Bloom filter. Array 26 is identified as being for epoch 7832, which for this example is the current, or latest, time interval which has not yet ended. Array 28 stores request-identifying data for requests which were received during epoch 7831, the immediately preceding time period. Array 30 stores request identifying data for epoch 7832 minus N plus one. Two client entities 32 and 34 are shown coupled to the server 24 through a network 36. As indicated, client 32 has stored information indicating that the latest server 24 epoch is 7831, which is not equal to the latest epoch number. This difference results from client 32 having sent its last request to server 24 during epoch 7831 and having stored the epoch number from a reply message from server 24. Client 34 on the other hand has sent a request during the current epoch 7832 and has therefore stored the latest epoch number. Each client 32 and 34 includes its currently stored epoch number in the next request it sends to server 24. If a malicious client has stored a previous request from the clients 32, 34 and replays it, it will include the epoch number of the original request.

FIG. 3 illustrates a method of operation of embodiments of the invention using epoch numbers to avoid false positives while still rejecting replay attacks. At block 38, a client sends a request including an epoch number e to the server. At step 40, the server checks the received epoch number e to see if it corresponds to one of the currently stored epochs. For example, is it between 7832 and 7832 minus N plus one? If the answer is yes, then at block 42 the server calculates the hash values for the request. At step 44, the calculated hash values are compared against the Bloom filter array 26, 28, or 30 which corresponds to the epoch number which was included with the request. For example, if client 32 sends a request with epoch number 7831, the server looks to array 28 to check for a replay attack, even though the latest epoch is 7832. If at step 44 all the relevant bits are not equal to one, indicating a new request, then at step 46, the server sets the bits of the Bloom filter array to identify the new request. If the request indicated epoch 7831, the bits are changed in array 28, not in array 26 which is keeping track of requests with the latest epoch number. Array 28 is changed because a replay attack of a genuine request with epoch number 7831 would also have epoch number 7831. At step 48, the server processes the request which was received and determined not to be a replay attack. At step 48, the server may also reply to the client indicating that the request was processed and providing the current epoch number. A client with a non-current epoch number may therefore send only one request with the non-current epoch number, since it may receive the current epoch number with each reply.

In FIG. 3, at step 40, the epoch number e may be so out of date that it does not correspond with any of the N Bloom filter arrays currently residing in the server 24. At step 44, the server may have identified a match between the hash values for the request and the bits stored in the Bloom filter array, i.e. $b[f_i(r)]=1$ for filter e. In either of these two cases, at step 50, the server sends a rejection and the current epoch number back to the client. At step 52, the client may send a new request with the current epoch number and/or otherwise modified so that it will be accepted by the server.

With further reference to FIGS. 2 and 3, alternative embodiments of the invention using epoch numbers will be described. Each epoch may represent a time interval having a starting time and an ending time. The ending time of epoch 7831 is the same as the starting time epoch 7832. At any given time, the current or latest epoch, e.g. epoch 7832, may have a known starting time, but an unknown ending time which will be some future time. If desired, each epoch may be identified in the server by its starting and ending times or the latest epoch may be identified by its starting time. Then, a time stamp on each request may be used to assign the request to the correct epoch. The use of time stamps may avoid sending epoch numbers in replies from the server to the clients. It may also avoid storing epoch numbers in the clients and including the stored epoch number in the next request sent to the server. However, this use of time stamps is subject to errors if the client and server clocks are not synchronized. As mentioned above, synchronization errors may be avoided by having the server advance its clock if it receives a message with a time stamp in the future.

The use of epoch numbers is not limited to systems which use multiple Bloom filters. A system with only one Bloom filter may benefit from the use of epoch numbers also. As discussed with reference to FIG. 1, to avoid false positives, a Bloom filter should be reset from time to time. Requests with time stamps before the reset time can be rejected as a way of avoiding replay attacks. But, inaccurate clock settings may allow some replay attacks to occur. If an epoch number is assigned to a single filter as discussed with reference to FIGS. 2 and 3, clock synchronization problems may be avoided.

Figure 4:
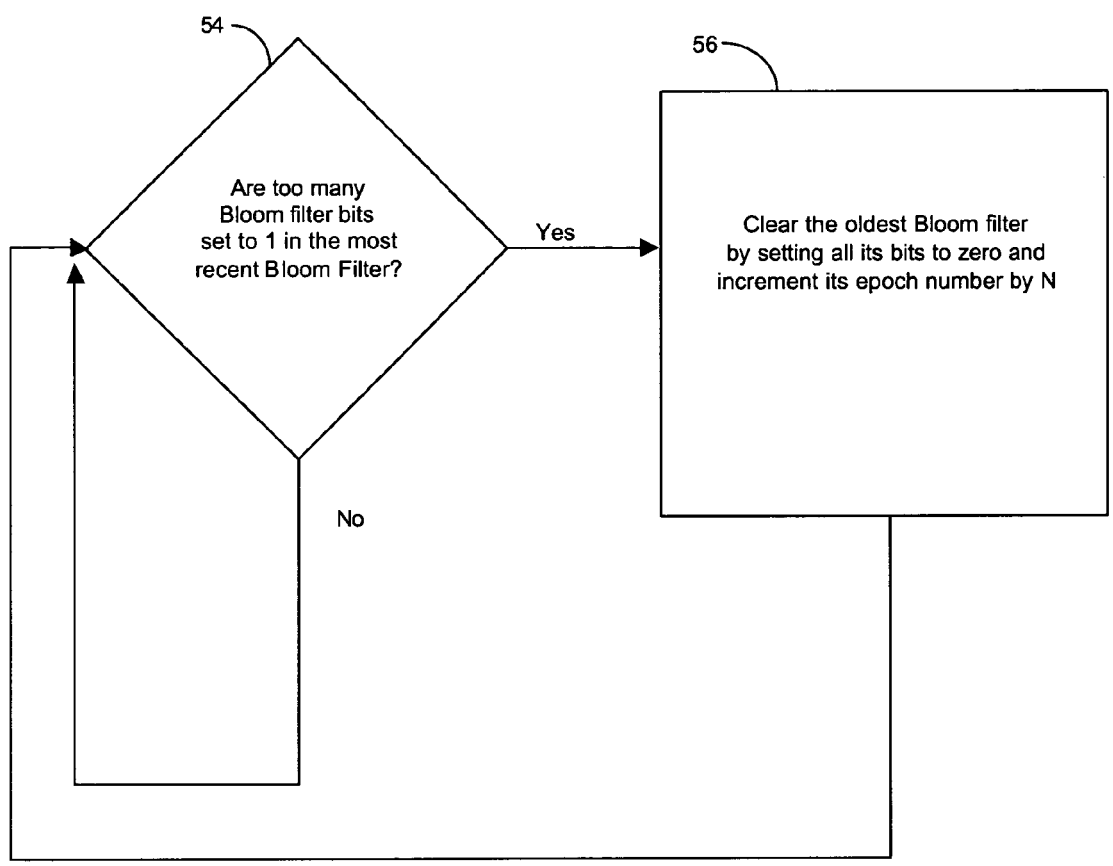
FIG. 4 illustrates a flow chart for resetting Bloom filters and controlling epoch numbers in embodiments of the invention.

FIG. 4 illustrates a process for clearing, resetting or recycling Bloom filters according to at least some embodiments of the invention. As noted above, at some point, a given filter array may accumulate so many bits in the one state, that the false positive rate becomes undesirable. FIG. 4 illustrates actions for embodiments of the invention with a single Bloom filter and for embodiments of the invention with multiple Bloom filters. As each request is accepted, and new bits are changed to ones in the filter array, at step 54, the server checks the number of bits which have been set to one. If there are multiple filter arrays, the check is done for only the array for the current epoch. If there is only one filter, it may be the array for the current epoch. If the number is too high, meaning there may be an undesirable false positive rate, then at step 56 a Bloom filter is reset to its empty state with all bits set to zero and an epoch number adjustment is made. If there are multiple Bloom filters, it is the filter for the oldest epoch which is reset and its epoch number is incremented by N which sets it to one higher than the (previously) latest epoch number. If there is only one Bloom filter, it is reset and its epoch number is simply incremented by one, which is the number N for an embodiment with only one Bloom filter. In either case, the filter with records from the oldest epoch is reset to empty state and redesignated as the filter for the now latest epoch. There is no practical difference between resetting a particular Bloom filter to empty state and creating or setting up a new Bloom filter, which starts in the empty state.

Since false positives may occur at some rate and some genuine client requests may be rejected as replay attacks, the client may benefit from having a way to reissue its request. Requests may include a "nonce". A nonce is an otherwise meaningless string of bits or bytes added to a message to make it unique. When a rejection message is received, the client may change the request's nonce and retransmit the request. Therefore, when the nonce is changed, one or more of the hash functions may change and the request may not be recognized as a replay.

There are several optional ways to improve performance of embodiments of the invention in certain circumstances. Messages between clients and servers may be transmitted with a message authentication code, MAC, for various security purposes. When MACs are used, operation of the invention may be simplified by applying the hash functions to only the MAC portion of the request. The epoch number and nonce may be included in that part of the request which is guarded by the MAC to prevent an attacker from altering them.

A second improvement applies to the case in which a server may be providing a storage service that accepts read and write requests. If these requests are encrypted, then read requests may not need to be checked or added to the Bloom filter, since an adversary may gain nothing by replaying them. Even if the requests are not encrypted, it may not be necessary to check recent read requests, because the attacker could have snooped on the reply of the original read request. Thus, only very old read requests may need to be filtered out, and this can be accomplished by simply verifying that the request's epoch number is valid or its time stamp is after the last resetting time of an active Bloom filter. There may not be a need to use the Bloom filter at all. Epoch numbers should be periodically advanced and Bloom filters reset when this improvement is used, even if a false positive threshold is not reached.

There are circumstances where data in the Bloom filter bit arrays may be lost. For example, a power outage may cause an unexpected shutdown which causes loss of data in RAM. When the system is restarted, all Bloom filters will be cleared, i.e. set to the empty state and will be assigned new epoch numbers. The embodiments of the invention described above may prevent replay attacks if the new epoch numbers are all larger than the previous latest epoch number. This may be accomplished by permanently storing the latest epoch number, for example on a hard drive or in flash memory, and updating it each time the epoch number is adjusted. Upon restarting a permanently stored epoch number may be used to set new epoch numbers greater than the stored number.

The invention was tested by incorporation into a system of secure network-attached disks. Two 32 KB Bloom filters (262,144 bits each) were used. Other parameters were determined by optimizing, using statistical simulation, for the maximum number of requests on average that can be supported per epoch subject to a maximum false positive rate, measured over the last one thousand requests, of 0.1%. The resulting parameters were nine hash functions and about 47% of bits used in a "full" filter. These parameters provided epochs lasting 18,640 requests on average, or thirty minutes under the request rate of the file system used to analyze system performance. Although separate performance figures are not available, the combination of calculating a MAC and doing the Bloom filter replay attack check increases the latency of reads and writes by less than 0.5 milliseconds.

Figure 5:
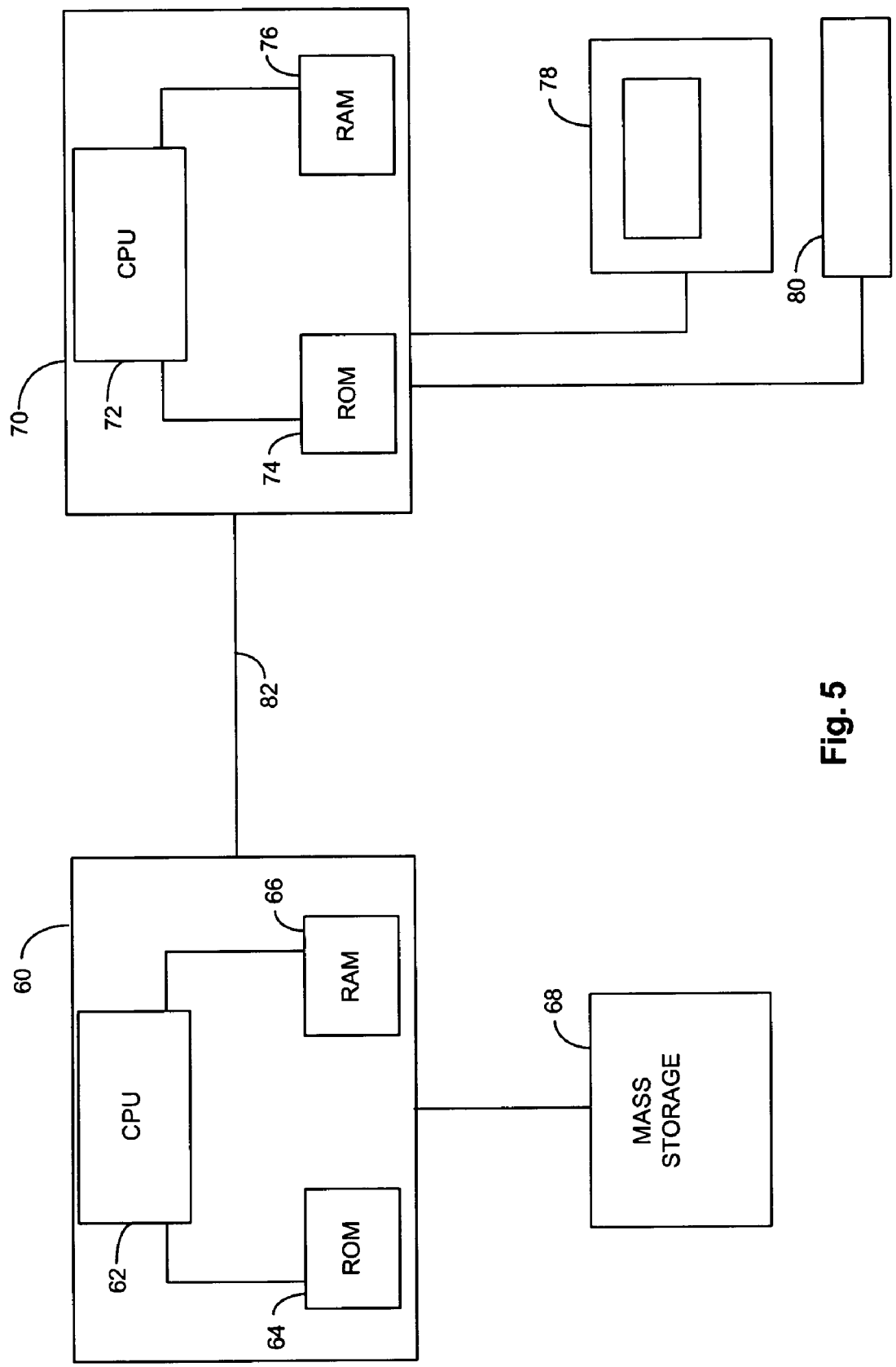
FIG. 5 illustrates a block diagram of computational entities coupled by a network for exchanging requests and replies in embodiments of the invention.

FIG. 5 illustrates a system diagram of computational entities coupled by a network for exchanging requests and replies in which the invention may be embodied. A server 60 may include a processor or CPU 62 coupled to various elements including read only memory, ROM, 64 and random access memory, RAM, 66. The server 60 may also be coupled to external devices such as a mass storage device 68, which may include solid state memory or disk drives. In an embodiment, the Bloom filter bit arrays 26, 28, 30 of FIG. 2 may be set up by assigning memory locations in the RAM 66. Software code that generates hash functions, compares the hash functions to data stored in the Bloom filters and changes bits in the Bloom filter may be stored in ROM 64. The software code may be executed by CPU 62.

A client 70 may include a processor or CPU 72 coupled to various elements including read only memory, ROM, 74 and random access memory, RAM, 76. As indicated in FIG. 5, the basic internal structure of the client 70 and server 60 may be similar. The functions of server and client may be determined by software, e.g. stored in ROM 64 and 74, and the types of external devices coupled to the machines. The client 70 may be coupled to external devices such as a video monitor 78 and keyboard 80, for providing a user interface. The client functions used in embodiments of the invention may be implemented in the form of software stored in ROM 74 and executed in processor 72. Epoch numbers received from the server 60 may be stored in RAM 76. A user may initiate client requests, e.g. a stock sale order or the storing of payroll records in mass storage unit 68, by entering information using the keyboard 80 and monitor 78.

The server 60 and client 70 may be coupled to each other by a network connection 82. As indicated in FIG. 2, a system in accordance with embodiments of the invention may be designed to protect a server 60 from replay attacks from a plurality of clients, e.g. client 70, all of which may have access to the server 60 over network connections. Malicious clients may also use the network connections to snoop on the requests of genuine clients and send replay attacks.

From the above description of embodiments of the invention, it can be seen that this disclosure provides a method and system for preventing replay attacks which is simple, robust and frugal. It is particularly useful for servers which have few resources since it does not require much memory or computational power. Simulations indicate that with only a small additional hardware cost it is possible to manufacture commodity hard disks including embodiments of the invention which are immune to replay attacks for use on a secure Storage Area Network, SAN.

While the invention has been illustrated and described with reference to particular apparatus and methods of operation, various changes and substitutions of components and changes in the methods of operation may be made within the scope of the invention as set forth in the following claims.

What we claim as our invention is:
1. A method for preventing replay attacks, comprising:
receiving a request from a client at a server;
generating identifying data for the request;
comparing the identifying data to data in a Bloom filter;

rejecting the request if the identifying data matches data in the Bloom filter; and, processing the request if the identifying data does not match the data in the Bloom filter.

2. A method according to claim 1, further comprising:
storing the identifying data in the Bloom filter.

3. A method according to claim 1, wherein the request received from the client includes a time stamp, and further comprising:
resetting the Bloom filter to an empty state upon occurrence of a preselected event;
recording the reset time at which the filter was reset;
receiving a request from a client;
comparing a request time stamp to the reset time; and
if the request time stamp is prior to the reset time, rejecting the request.

4. A method according to claim 3, wherein:
the preselected event is a false positive rate above a preselected level.

5. A method according to claim 1, further comprising:
generating an epoch number in the server, the epoch number representing a time interval including the current time;
transmitting the epoch number to clients in response to client requests and storing the epoch number in the clients; and
including the stored epoch numbers in each request sent by a client to the server.

6. A method according to claim 5, further comprising:
upon occurrence of a preselected event, resetting the Bloom filter to an empty state and incrementing the epoch number;
receiving a request from a client; and
if the epoch number received with the request does not match the current epoch number, rejecting the request.

7. A method for preventing replay attacks, comprising:
setting up concurrently operating first and second Bloom filters in a server receiving requests from at least one client;
associating each request with a select one of said first and second Bloom filters;
storing data identifying requests associated with the first Bloom filter in the first Bloom filter; and
storing data identifying requests associated with the second Bloom filter in the second Bloom filter.

8. A method according to claim 7, further comprising:
receiving a request from a client at the server, the request including an indication of the Bloom filter with which it is associated;
generating identifying data for the request;
if the request is associated with the first Bloom filter, comparing the identifying data to data in the first Bloom filter; and
if the request is associated with the second Bloom filter, comparing the identifying data to data in the second Bloom filter.

9. A method according to claim 8, further comprising:
if the request is not associated with the first Bloom filter or the second Bloom filter, rejecting the request.

10. A method according to claim 7, further comprising:
deleting the second Bloom filter upon occurrence of a preselected event;
creating a third Bloom filter; and
instructing clients to associate new requests with the third Bloom filter.

11. A method according to claim 10, further comprising:
receiving a request from a client at the server, the request including an indication of the filter with which it is associated;
generating identifying data for the request;
if the request is associated with the first Bloom filter, comparing the identifying data to data in the first Bloom filter; and
if the request is associated with the third Bloom filter, comparing the identifying data to data in the third Bloom filter.

12. A method according to claim 11, further comprising:
if the request is not associated with the third Bloom filter or the first Bloom filter, rejecting the request.

13. A method according to claim 10, wherein:
the preselected event is a false positive rate above a preselected level.

14. A system for preventing replay attacks, comprising:
a server receiving requests and generating data identifying each request;
a Bloom filter storing data identifying each request received by the server, and indicating whether the data matches or does not match previously stored data; and
the server processing requests whose identifying data does not match previously stored data in the Bloom filter and rejecting requests whose identifying data does match previously stored data in the Bloom filter.

15. A system according to claim 14, wherein the server is part of a storage area network.

16. A system for preventing replay attacks, comprising:
a server receiving requests and generating data identifying each request, each request including a time indicator indicating its time of issuance;
a first Bloom filter storing data identifying each received request having a time indicator corresponding to a first time interval and indicating whether the data matches or does not match previously stored data;
a second Bloom filter, operating concurrently with the first Bloom filter, storing data identifying each received request having a time indicator corresponding to a second time interval and indicating whether the data matches or does not match previously stored data; and
the server processing requests whose identifying data does not match previously stored data and rejecting requests whose identifying data does match previously stored data.

17. A system according to claim 16, wherein:
each of said first and second time intervals are identified by a starting time and an ending time.

18. A system according to claim 16, wherein:
each of said first and second time intervals is identified by an epoch number.

19. A system according to claim 16, wherein the first time interval includes the current time and the second time interval occurred immediately before the first time interval, and further comprising:
the server detecting the occurrence of a preselected event, resetting the second Bloom filter to empty state, recording the time of resetting the second Bloom filter, and rejecting requests having a time indicator indicating issuance prior to the first time interval;
the time of resetting ending the first time interval and starting a third time interval; and the second Bloom filter storing data identifying each received request having a time indicator corresponding to the third time interval and indicating whether the data matches or does not match previously stored data.

20. A system for preventing replay attacks, comprising:

means for producing data identifying a request received by a server, means for comparing the data identifying the request to Bloom filter data identifying previously received requests, and means for rejecting the request if the identifying data matches said Bloom filter data.

* * * * *